(12) United States Patent
Kuan et al.

(10) Patent No.: US 7,702,775 B2
(45) Date of Patent: Apr. 20, 2010

(54) MONITORING A LOCAL AREA NETWORK

(75) Inventors: Chia-Chee Kuan, Los Altos, CA (US); Miles Wu, Fremont, CA (US); Dean Au, Sunnyvale, CA (US)

(73) Assignee: Airmagnet Inc., Mountain View, CA (US)

( * ) Notice: Subject to any disclaimer, the term of this patent is extended or adjusted under 35 U.S.C. 154(b) by 1298 days.

(21) Appl. No.: 10/410,668

(22) Filed: Apr. 8, 2003

(65) Prior Publication Data

US 2003/0224797 A1  Dec. 4, 2003

Related U.S. Application Data

(60) Provisional application No. 60/371,084, filed on Apr. 8, 2002.

(51) Int. Cl.
*G06F 15/173* (2006.01)

(52) U.S. Cl. .................. 709/224; 709/223; 370/252; 714/39

(58) Field of Classification Search ......... 709/223–224; 713/201; 370/338, 329, 252; 345/456.1; 342/457, 465; 340/825; 714/39
See application file for complete search history.

(56) References Cited

U.S. PATENT DOCUMENTS

| 5,889,772 | A | 3/1999 | Fischer et al. |
| 6,031,833 | A | 2/2000 | Fickes et al. |
| 6,473,413 | B1 | 10/2002 | Chiou et al. |
| 6,553,336 | B1 | 4/2003 | Johnson et al. |
| 6,625,115 | B1* | 9/2003 | Ikeda et al. .................. 370/217 |
| 6,646,604 | B2* | 11/2003 | Anderson .................... 342/465 |
| 6,657,981 | B1 | 12/2003 | Lee et al. |
| 6,674,738 | B1* | 1/2004 | Yildiz et al. ................. 370/338 |
| 6,842,460 | B1 | 1/2005 | Olkkonen et al. |
| 7,149,521 | B2 | 12/2006 | Sundar et al. |
| 7,167,713 | B2* | 1/2007 | Anderson ................. 455/456.1 |
| 7,271,765 | B2* | 9/2007 | Stilp et al. ................... 342/457 |
| 2002/0077787 | A1 | 6/2002 | Rappaport |
| 2002/0085516 | A1 | 7/2002 | Bridgelall |

(Continued)

FOREIGN PATENT DOCUMENTS

CN    1247657    3/2000

(Continued)

OTHER PUBLICATIONS

International Preliminary Examination Report mailed on Jan. 2, 2004, for PCT patent application No. PCT/US03/10727 filed Apr. 8, 2003, 4 pages.

(Continued)

*Primary Examiner*—Thu Ha T Nguyen
(74) *Attorney, Agent, or Firm*—Blakely, Sokoloff, Taylor & Zafman LLP

(57) ABSTRACT

A wireless local area network (WLAN) is monitored by receiving transmissions exchanged between one or more stations and an access point (AP) in the WLAN using a detector located in the WLAN. A database is compiled based on the received transmissions. The received transmissions are analyzed to determine the state of a station. The compiled database and the determined state of the station are used to diagnose connectivity problems of the station.

35 Claims, 6 Drawing Sheets

U.S. PATENT DOCUMENTS

| | | | |
|---|---|---|---|
| 2003/0037033 A1 | 2/2003 | Nyman et al. | |
| 2003/0081583 A1 | 5/2003 | Kowalski | |
| 2003/0117986 A1* | 6/2003 | Thermond et al. | 370/338 |
| 2003/0134636 A1 | 7/2003 | Sundar et al. | |
| 2003/0134638 A1* | 7/2003 | Sundar et al. | 455/435 |
| 2003/0135762 A1* | 7/2003 | Macaulay | 713/201 |
| 2003/0149891 A1* | 8/2003 | Thomsen | 713/201 |
| 2003/0221006 A1* | 11/2003 | Kuan et al. | 709/225 |
| 2004/0039817 A1 | 2/2004 | Lee et al. | |
| 2004/0066759 A1 | 4/2004 | Molteni et al. | |
| 2004/0073933 A1* | 4/2004 | Gollnick et al. | 725/81 |
| 2004/0110530 A1* | 6/2004 | Alone et al. | 455/552.1 |
| 2004/0252837 A1* | 12/2004 | Harvey et al. | 380/270 |
| 2005/0030929 A1* | 2/2005 | Swier et al. | 370/338 |
| 2005/0058112 A1* | 3/2005 | Lahey et al. | 370/338 |
| 2005/0147073 A1* | 7/2005 | Hietalahti et al. | 370/338 |
| 2005/0250440 A1* | 11/2005 | Zhou et al. | 455/12.1 |
| 2006/0078123 A1* | 4/2006 | Bichot et al. | 380/270 |
| 2006/0280140 A9* | 12/2006 | Mahany et al. | 370/329 |
| 2008/0013487 A1 | 1/2008 | Molteni et al. | |

FOREIGN PATENT DOCUMENTS

| | | |
|---|---|---|
| JP | 8-237334 | 9/1996 |
| JP | 9-130339 | 5/1997 |
| JP | 2001-86074 | 3/2001 |
| JP | 2001-512635 | 8/2001 |
| WO | WO 98/36532 | 8/1998 |
| WO | WO 02/17572 | 2/2002 |

OTHER PUBLICATIONS

International Search Report mailed on Nov. 13, 2003, for PCT patent application No. PCT/US03/10727 filed on Apr. 8, 2003, 4 pages.

Bardwell, J. "Assessing Wireless Security with AiroPeek" Internet Citation online, Jan. 13, 2002, XP002406414 retrieved Nov. 9, 2006 from the Internet: http://www.packetnexus.com/docs/AiroPeek_Security.pdf 6 pages.

Graham, R. Sniffing (network wiretap, sniffer) FAQ, online Internet Citation, Apr. 15, 2000, XP002357967, retrieved 2006 from the internet: http://www.robertgraham.com/pubs/sniffing-faq.html 45 pages.

IBM Research, "IBM Research Demonstrates Industry's First Auditing Tool For Wireless Network Security", online internet citation, Jul. 12, 2001, XP002263357, retrieved Nov. 28, 2003 from the Internet http://www.research.ibm.com/resources/news/20010712_wireless.shtml 1 page.

Sheu, Shiann-Tsong, et al.,"Dynamic Access Point Approach (DAPA) for IEEE 802.11 Wireless LANs", Vehicular Technology Conference, Fall 1999. IEEE VTS 50$^{th}$ Amsterdam, Netherlands, Sep. 19-22, 1999, Piscataway, NJ USA vol. 5, Sep. 19, 1999, XP010353384. ISBN 07803-5435-4 pp. 2646-2650.

International Preliminary Examination Report mailed on Jan. 2, 2004 for PCT/US03/10727 filed Apr. 8, 2003.

International Search Report mailed on Nov. 13, 2003 for PCT/US03/10727 filed on Apr. 8, 2003.

* cited by examiner

MONITORING A LOCAL AREA NETWORK

CROSS REFERENCE TO RELATED APPLICATION

This application claims the benefit of an earlier filed provisional application U.S. Provisional Application Ser. No. 60/371,084, entitled MONITORING A LOCAL AREA NETWORK, filed on Apr. 8, 2002, the entire content of which is incorporated herein by reference.

BACKGROUND

1. Field of the Invention

The present invention generally relates to wireless local area networks. More particularly, the present invention relates to monitoring a wireless local area network.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

In accordance with the IEEE 802.11 standard, a station is authenticated and associated with an access point in the WLAN before obtaining service from the access point. During this authentication and association process, the station proceeds through 3 stages or states (i.e., State 1, State 2, and State 3). In State 1, the station is unauthenticated and unassociated. In state 2, the station is authenticated but unassociated. In State 3, the station is authenticated and associated. If a station has a connectivity problem, such as difficulty obtaining service from an access point, diagnosing the cause of the connectivity problem can be difficult.

SUMMARY

In one exemplary embodiment, a wireless local area network (WLAN) is monitored by receiving transmissions exchanged between one or more stations and an access point (AP) in the WLAN using a detector located in the WLAN. A database is compiled based on the received transmissions. The received transmissions are analyzed to determine the state of a station. The compiled database and the determined state of the station are used to diagnose connectivity problems of the station.

DESCRIPTION OF THE DRAWING FIGURES

The present invention can be best understood by reference to the following detailed description taken in conjunction with the accompanying drawing figures, in which like parts may be referred to by like numerals:

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
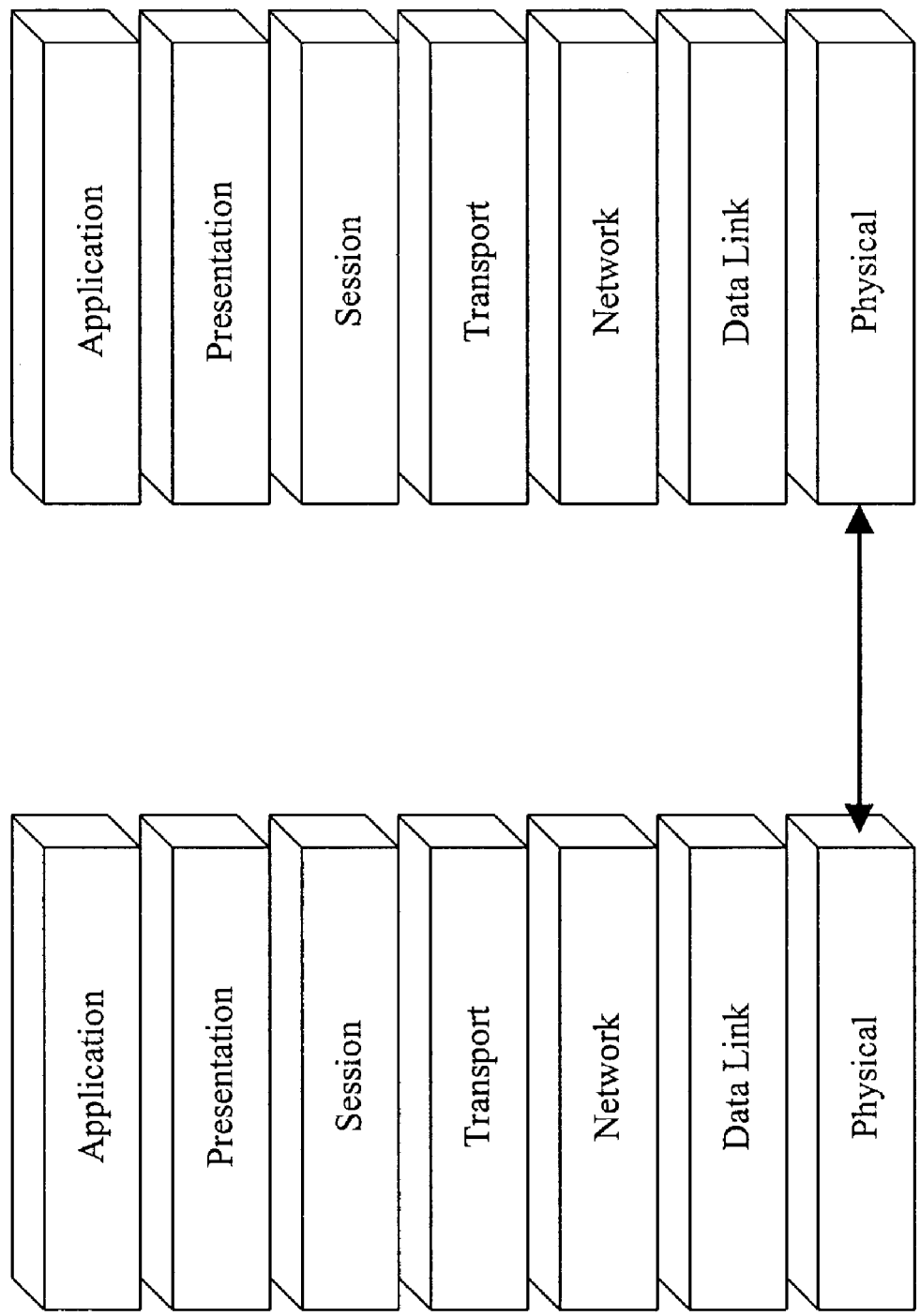
FIG. 1 shows an exemplary Open Systems Interconnection (OSI) seven layer model.

With reference to FIG. 1, an exemplary Open Systems Interconnection (OSI) seven layer model is shown, which represents an abstract model of a networking system divided into layers according to their respective functionalities. In particular, the seven layers include a physical layer corresponding to layer 1, a data link layer corresponding to layer 2, a network layer corresponding to layer 3, a transport layer corresponding to layer 4, a session layer corresponding to layer 5, a presentation layer corresponding to layer 6, and an application layer corresponding to layer 7. Each layer in the OSI model only interacts directly with the layer immediately above or below it.

As depicted in FIG. 1, different computers can communicate directly with each other only at the physical layer. However, different computers can effectively communicate at the same layer using common protocols. For example, one computer can communicate with another computer at the application layer by propagating a frame from the application layer through each layer below it until the frame reaches the physical layer. The frame can then be transmitted to the physical layer of another computer and propagated through each layer above the physical layer until the frame reaches the application layer of that computer.

The IEEE 802.11 standard for wireless local area networks ("WLANs") operates at the data link layer, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
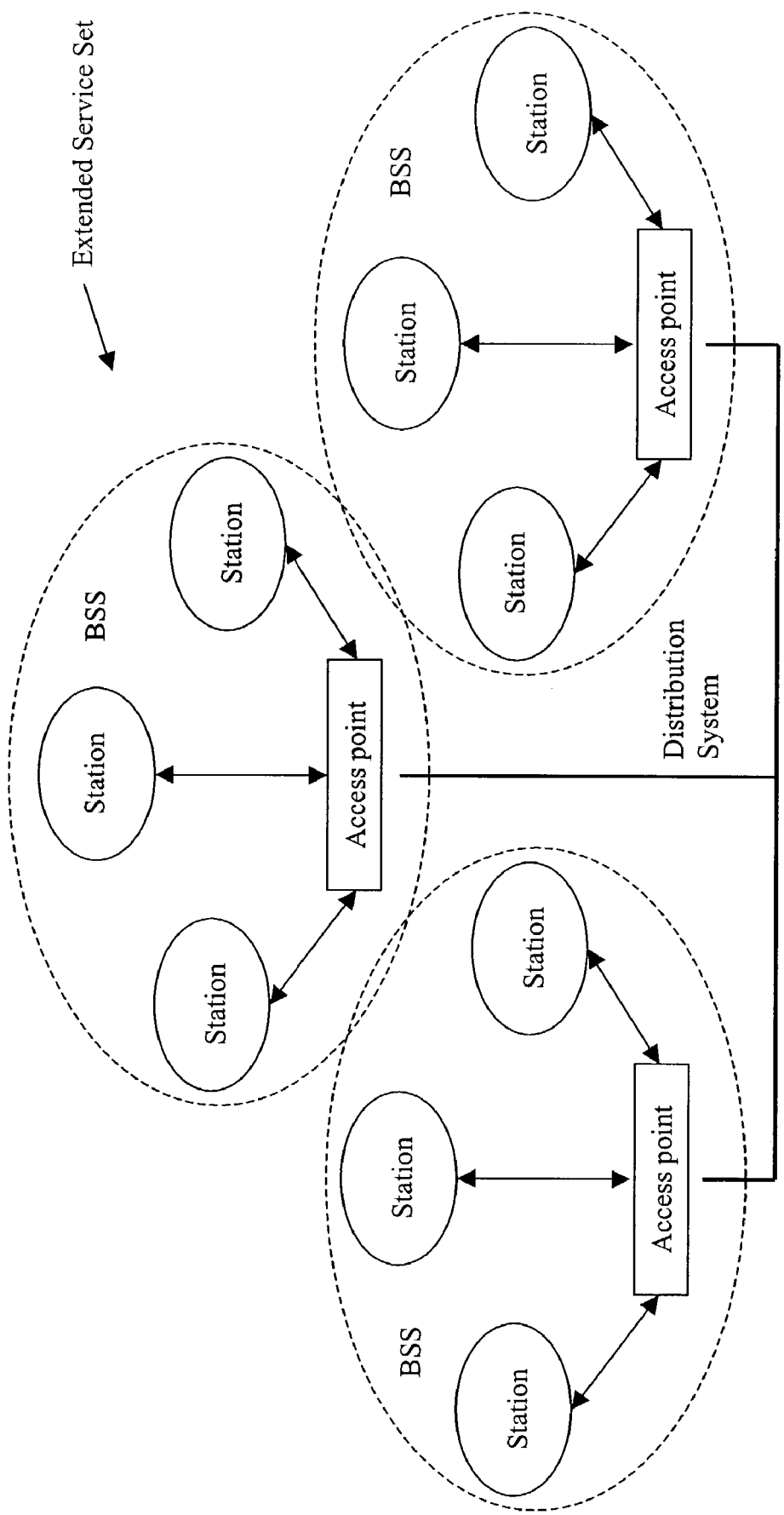
FIG. 2 shows an exemplary extended service set in a wireless local area network ("WLAN")

With reference to FIG. 2, an example of an extended service set, which forms a WLAN according to the IEEE 802.11 standard, is depicted having three basic service sets ("BSS"). Each BSS can include an access point ("AP") and one or more stations. A station is a component that can be used to connect to the WLAN, which can be mobile, portable, stationary, and the like, and can be referred to as the network adapter or network interface card. For instance, a station can be a laptop computer, a personal digital assistant, and the like. In addition, a station can support station services such as authentication, deauthentication, privacy, delivery of data, and the like.

Each station can communicate directly with an AP through an air link, such as by sending a radio or infrared signal between WLAN transmitters and receivers. Each AP can support station services, as described above, and can additionally support distribution services, such as association, disassociation, distribution, integration, and the like. Accordingly, an AP can communicate with one or more stations within its BSS, and with other APs through a medium, typically called a distribution system, which forms the backbone of the WLAN. This distribution system can include both wireless and wired connections.

Figure 3:
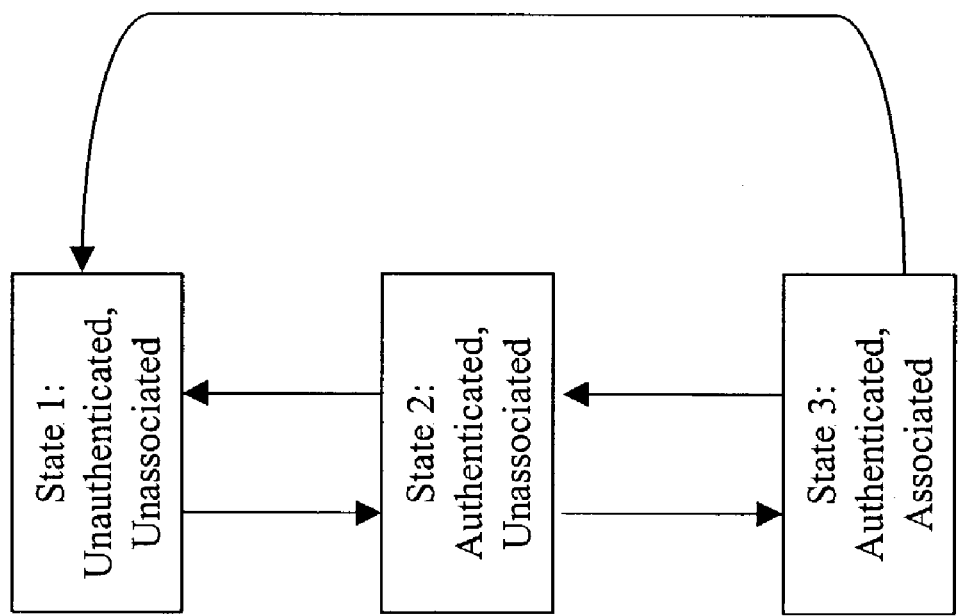
FIG. 3 is an exemplary flow diagram illustrating various states of stations in a WLAN.

With reference to FIGS. 2 and 3, under the current IEEE 802.11, standard, each station must be authenticated to and associated with an AP in order to become a part of a BSS and receive service from an AP. Accordingly, with reference to FIG. 3, a station begins in State 1, where the station is unauthenticated to and unassociated with an AP. In State 1, the station can only use a limited number of frame types, such as frame types that can allow the station to locate and authenticate to an AP, and the like.

If a station successfully authenticates to an AP, then the station can be elevated to State 2, where the station is authenticated to and unassociated with the AP. In State 2, the station can use a limited number of frame types, such as frame types that can allow the station to associate with an AP, and the like.

If a station then successfully associates or reassociates with an AP, then the station can be elevated to State 3, where the station is authenticated to and associated with the AP. In State 3, the station can use any frame types to communicate with the AP and other stations in the WLAN. If the station receives a disassociation notification, then the station can be transitioned to State 2. Furthermore, if the station then receives a deauthentication notification, then the station can be transitioned to State 1. Under the IEEE 802.11 standard, a station can be authenticated to different APs simultaneously, but can only be associated with one AP at any time.

With reference again to FIG. 2, once a station is authenticated to and associated with an AP, the station can communicate with another station in the WLAN. In particular, a station can send a message having a source address, a basic service set identification address ("BSSID"), and a destination address, to its associated AP. The AP can then distribute the message to the station specified as the destination address in the message. This destination address can specify a station in the same BSS, or in another BSS that is linked to the AP through the distribution system.

Although FIG. 2 depicts an extended service set having three BSSs, each of which include three stations, an extended service set can include any number of BSSs, which can include any number of stations.

Figure 4:
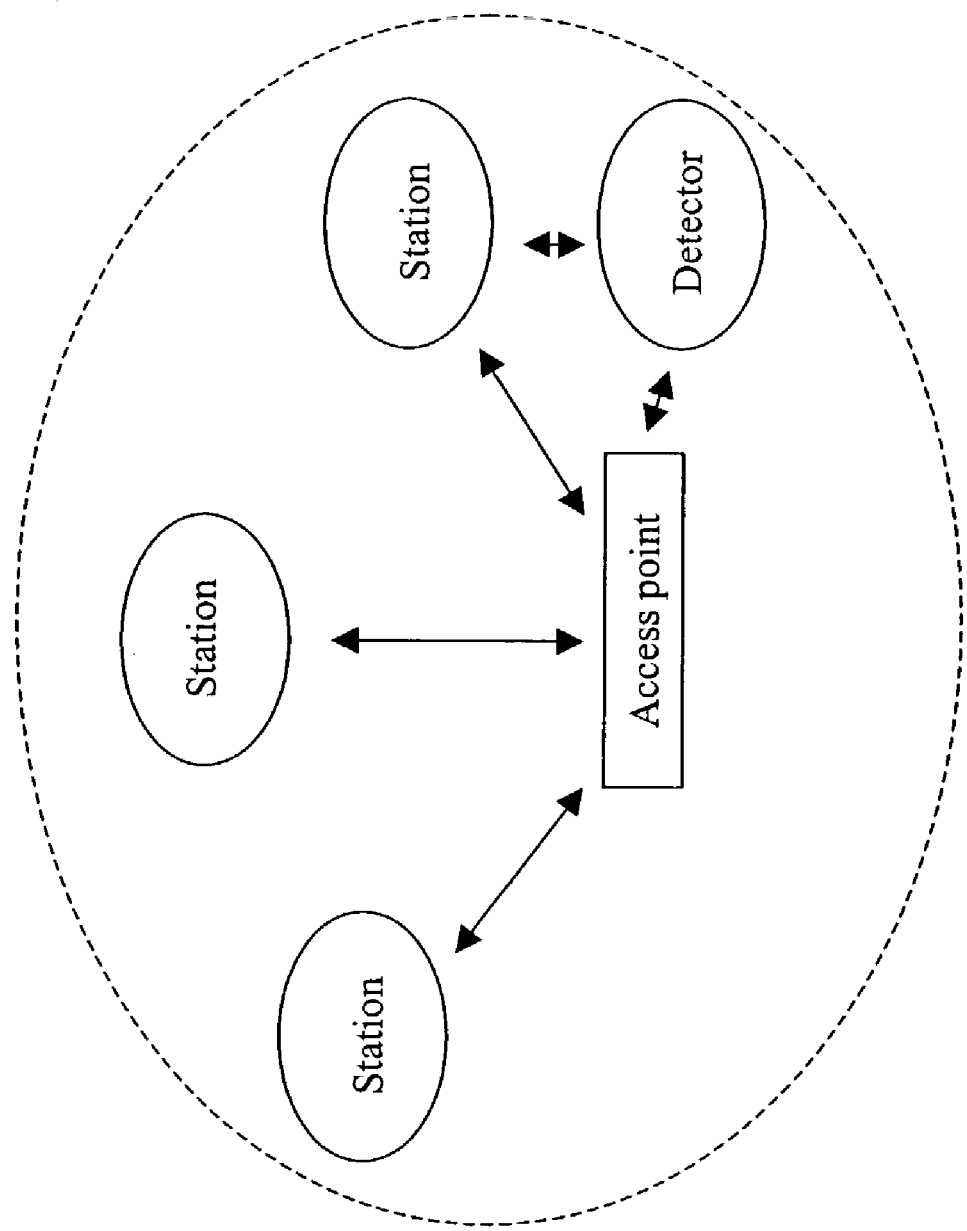
FIG. 4 shows an exemplary embodiment of an access point and a station exchanging transmissions.

With reference to FIG. 4, a detector can be used to monitor a WLAN. More specifically, the detector can be configured to receive transmissions on the WLAN, then compile a database based on the received transmissions. As will be described below, the information compiled in the database can then be used to monitor the WLAN for the occurrence of various events and/or to diagnose problems.

Figure 5:
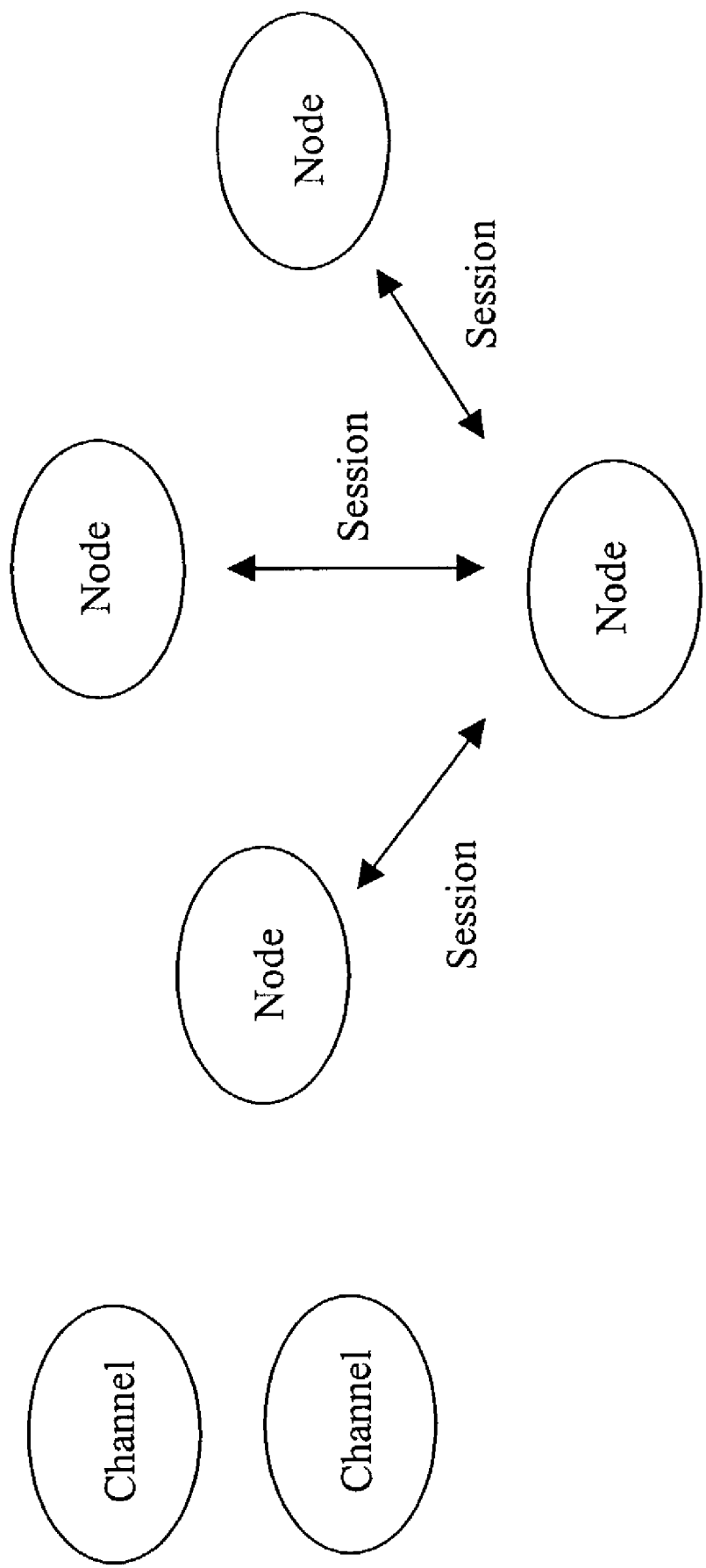
FIG. 5 shows elements of an exemplary database.

With reference to FIG. 5, in one configuration, the database compiled by the detector includes node elements, session elements, and channel elements. Note that FIG. 5 is intended to depict the structure of the database compiled by the detector in abstract and not intended to depict the actual structure of the database.

A node element is associated with a node in the WLAN, such as an AP or a station. In one configuration, node elements are indexed by MAC addresses, which can be obtained from the source and destination address fields of frames. Each node element in the database includes one set of statistics that tracks the number of transmissions into that node and another set of statistic that tracks the number of transmissions out of that node. The set of statistics categorizes transmissions according to frame types (beacon, probes, etc.), address type (unicast, multicast, broadcast, etc.), receive radio attributes (signal strength, noise, CRC error, transmission speed, et.). Each node element can also include one or more of the following fields:

createtime (time when the node is discovered)
    MACaddress (MAC address of the node)
    BeaconInterval (the beacon interval if the node is an AP)
    Capability (bit map of ESS/IBSS, CF-poll, wired equivalent privacy (WEP), preamble, channel agility, etc.)
    AuthAlgos (Open system or share key authentication)
    IsInEssMODE (Infrastructure mode)
    HasPrivacy (WEP enabled)
    SupportShortPreamble (Short preamble supported)
    IsAP (this node is an AP)
    IsBridge (this node is a bridge)
    ApAnnouncedSSID (If it is an AP, did it announce SSID)
    SSID (SSID of the node (AP or Station))
    APNAME (If node is an AP, its announced AP name)
    DSParamSet (Channel assignment)
    SupportedRates (1, 2, 5.5, or 11 mbps)
    IPAddress (IP address of the node)

A session element is associated with a session established between any two nodes, such as when a station is authenticated and associated with an AP. Each session element in the database includes one set of statistics that tracks the number of transmissions in one direction between two nodes and another set of statistics that tracks the number of transmissions in another direction between two nodes. For example, if the session is between a station and an AP, one set of statistics tracks the number of transmissions from the station to the AP and another set of statistics tracks the number of transmissions from the AP to the station.

A channel element is associated with a channel in the WLAN. In the current implementation of the IEEE 802.11 standard, a total of 11 channels are used in the US, 13 channels are used in Europe, and 14 channels are used in Japan. Each channel element in the database includes a set of statistics that tracks the number of transmissions in that channel.

Having thus described the basic configuration of the database compiled by the detector, the following describes the different types of transmissions that can be received by the detector and the types of information that can be obtained from the transmissions:

TABLE 1

| Types of Transmissions | Obtained Information |
| --- | --- |
| Beacon Frame | Beacon Interval, Capability, Privacy Preamble, SSID, Supported Rates, Channel, AP name |
| Probe Request | SSID of sender node, Supported Rate of SSID |
| Probe Response | Beacon Interval, Capability, Privacy Preamble, SSID, Supported Rates, Channel, AP name |
| Authentication Frame | Authentication Algorithm (Open System or Shared Key), Authentication State Information (Authentication Sequence Number) |
| DeAuthentication Frame | Indication that the Session has been terminated |
| Association Request & ReAssociation | Sender's Capability, Supported Rates, SSID |

TABLE 1-continued

| Types of Transmissions | Obtained Information |
|---|---|
| Association Response | Capability, Confirm that a Session has been established |
| Data Frame | IP address, Confirm that a Session has been established, Identity of Sender, Identity of Destination, Identity of AP used |

The information obtained from the received transmissions can then be used to compile and/or update the database. For example, assume that the detector receives a beacon frame from a node that has not been added to the database. As such, a new node element is created in the database, assume that this node is labeled Node1. As described above, MAC addresses can be obtained from the source and destination address fields of frames. Additionally, a beacon frame is transmitted by an AP. As such, Node1 can be identified as an AP and by its MAC address. Additionally, as described above, a beacon frame can include information such as Beacon Interval, Capability, Privacy Preamble, SSID, Supported Rates, Channel, and AP name. As such, the appropriate fields of Node1 is updated with this information. Additionally, the set of statistics to track outbound transmissions for Node1 is updated. The set of statistics for the appropriate channel element is also updated.

Now assume that a probe request is received from a node that has not been added to the database. As such, a new node element is created in the database, assume that this node is labeled Node2. Additionally, a probe request is transmitted by a station. As such, Node2 can be identified as a station. Additionally, as described above, a probe request can include information such as SSID of the sender node and the Supported Rate of the sender node. As such, the appropriate fields of Node2 is updated with this information. Additionally, the set of statistics to track outbound transmissions for Node2 is updated. Moreover, assuming that the probe request is sent to Node1, which can also be determined from the probe request, the set of statistics to track inbound transmissions for Node1 is updated. The statistics field for the appropriate channel element is also updated.

The SSID of an AP can be suppressed in the beacon frame, meaning that the SSID cannot be obtained from the beacon frame. In such an instance, the SSID of the AP can be obtained from the probe request of a station that sends the probe request to the AP and the AP sends a probe response to the station. The AP would not have sent the probe response to the station had the probe request not contained the proper SSID. Thus, in this manner, the SSID of an AP that suppresses its SSID in its beacon can be determined based on the probe request sent by a station to the AP.

Now assume that a data frame is received from a node that has not been added to the database. As such, a new node element is created in the database, assume that this node is labeled Node3. Also assume in this instance that the data frame is being sent from Node3 to Node1. The identity of Node3 and Node1 can be obtained by examining the data frame's header information, and more particularly the destination and source addresses. As such, even if the existence of Node1 had not been known, its existence can be discerned from the data frame. The transmission of the data frame between Node3 and Node1 also establishes that the two nodes are operating on the same channel and are using the same authentication algorithm. Thus, the appropriate fields for Node3 and Node1 can be updated. The set of statistics to track outbound transmissions for Node3, the set of statistics to track inbound transmissions for Node1, and the set of statistics of the appropriate channel element is also updated.

Additionally, Node1 and Node3 can be identified as stations or APs based on the header of the data frame. More particularly, an AP is identified as a distribution system in the header of the data frame. As such, if only the destination address of the data frame from Node3 to Node1 specified a distribution system, then Node1 can be identified as an AP and Node3 can be identified as a station. However, if both the destination and source addresses specified a distribution system, then Node1 and Node3 are both APs, and more particularly APs operating as a bridge. Thus, in this manner, nodes operating as bridges in the WLAN can be identified based on a data frame received at the detector.

The receipt of the data frame also confirms that a session has been established between Node3 and Node1. As such, a session element is created in the database, assume that this session is labeled Session1. The set of statistics to track transmissions from Node3 to Node1 is then updated.

If the data frame is encrypted, then Node1 and Node3 can be identified as using wired equivalent privacy (WEP) encryption. The appropriate fields in Node1 and Node3 are then updated.

In this manner, the database of the nodes, sessions, and channels within the WLAN can be compiled by the detector. Note, however, that the above examples are not meant to be comprehensive descriptions of the process of compiling the database. Rather, the above examples are meant to be illustrative of the process.

In the present exemplary embodiment, the detector compiles the database by receiving transmissions over a period of time. In one configuration, the detector compiles the database over a period of several minutes, such as 5, 10, or more minutes. Note, however, that the period of time can vary depending on the circumstances. For example, a longer period of time, such as an hour or more, can be used for a more comprehensive assessment of the WLAN.

As described above, the detector can receive transmissions over the WLAN by scanning the available channels in the WLAN. Alternatively, specific channels can be selected to be scanned. As also described above, the number of available channels can vary depending on the country. For example, in the US a total of 11 channels are used, in Europe a total of 13 channels are used, and in Japan a total of 14 channels are used.

Although the detector scans the channels to receive transmissions, it passively receives the transmissions, meaning that it does not broadcast signals on the WLAN. An advantage of passively monitoring the WLAN is that additional bandwidth on the WLAN is not consumed.

The detector can be a station in the wireless local area network. Additionally, the detector can be mobile, portable, stationary, and the like. For instance, the detector can be a laptop computer, a personal digital assistant, and the like. In addition, the detector can be used by a user as a diagnostic tool, by an administrator as an administrative tool, and the like, to monitor the WLAN.

For example, the database compiled by the detector can be used to monitor the WLAN for the occurrence of various events. The following tables list examples of some security and performance events that can be detected based on the compiled database:

I. Security Events

TABLE 2

| Event | Detection Method |
| --- | --- |
| AP with WEP disabled | Examine beacon frame; examine data frames to determine if data frames are encrypted |
| Client with WEP disabled | Examine data frames to determine if data frames are encrypted |
| Flawed WEP encryption | Examine 3 sequential data frames to determine if the encryption fits a predictable pattern |
| Open System auth. used | Determine from authorization request and/or response |
| Device probing network | Examine probe request frame for SSID with length of zero and if probe request frame only has SSID field. Determine if station fails to proceed with authentication after receiving probe response. |
| Auth. failures exceeded | Count number of authentication failures. |
| AP unconfigured | Examine SSID of AP and determine if SSID is a default SSID |
| Unauthorized AP detected | Compare to a list of known and authorized AP. |
| Unauthorized client detected | Compare to a list of known and authorized clients |
| Spoofed MAC address | Examine sequence number of packages to and/or from a node |

II. Performance Events

TABLE 3

| Event | Detection Method |
| --- | --- |
| AP with weak signal strength | Determine based on data received from WLAN Card antenna. Signal can be considered weak if below an established threshold, such as 20%—Relative Signal Strength Indicator (RSSI) |
| CRC error rate exceeded | For each channel and node, compute rate from transmitted frames. Error rate exceeded if above an established threshold, such as 20%—CRC error frames to total frames ratio |
| Frame retry rate exceeded | For each channel and node, compute rate from transmitted frames. Retry rate exceeded if above an established threshold, such as 10%—802.11 retry frames to total frames ratio |
| Low speed tx rate exceeded | For each channel and node, compute rate from transmitted frames. Rate exceeded if above an established threshold, such as 70%—11 mbps data frames to total data frame ratio |
| AP association capacity full | Examine association response frame for error code #17 |
| Fragmentation rate exceeded | For each channel and node, compute rate from transmitted frames. Fragmentation rate exceeded if above an established threshold, such as 50% fragmented frames to total frames ratio |
| Bandwidth usage exceeded | For each channel and node, compute air time from transmitted frames |
| Excessive missed AP beacons | Count received beacon frames. Missed AP beacons excessive if over an established threshold, such as 50% missed beacons to expected beacons ratio |
| AP not supporting high speed | Determine from beacon frames and probe response frames |
| Channel with overloaded APs | Determine from number of nodes that are Access Points in the same channel |
| Missing performance options | Determine from compatibility fields in beacon frames and probe response frames |
| Both PCF and DCF active | Determine from compatibility fields in beacon frames and probe response frames |
| APs with mutual interference | Determine from number of nodes that are Access Points in the same channel and signals (RF) from Access Points |

TABLE 3-continued

| Event | Detection Method |
| --- | --- |
| Conflicting AP configuration | Determine from fields associated with nodes identified as Access Points. For example, if multiple APs have same SSID |
| Channel with high noise level | Determine based on data received from WLAN Card antenna |
| Excessive multicast/Broadcast | For each channel and frame, determine number of multicast/broadcast frames from transmitted frames. Number excessive if more than an established threshold, such as 10% of total frames |

In one configuration, when one of the events listed above is detected, the detector can be configured to provide an alarm. Note, however, that which events trigger an alarm and the type of alarm provided can be selected and/or altered by a user.

In addition to compiling a database, determining the state of a particular station can be desirable, such as in analyzing problems that the station may be experiencing in obtaining service. As described above, according to the current IEEE 802.11 standard, a station is authenticated and associated with an AP to become a part of a BSS and thus obtain service. As also described above, the steps in the authentication and association process is categorized into 3 states (i.e., State 1, State 2, and State 3).

Figure 6:
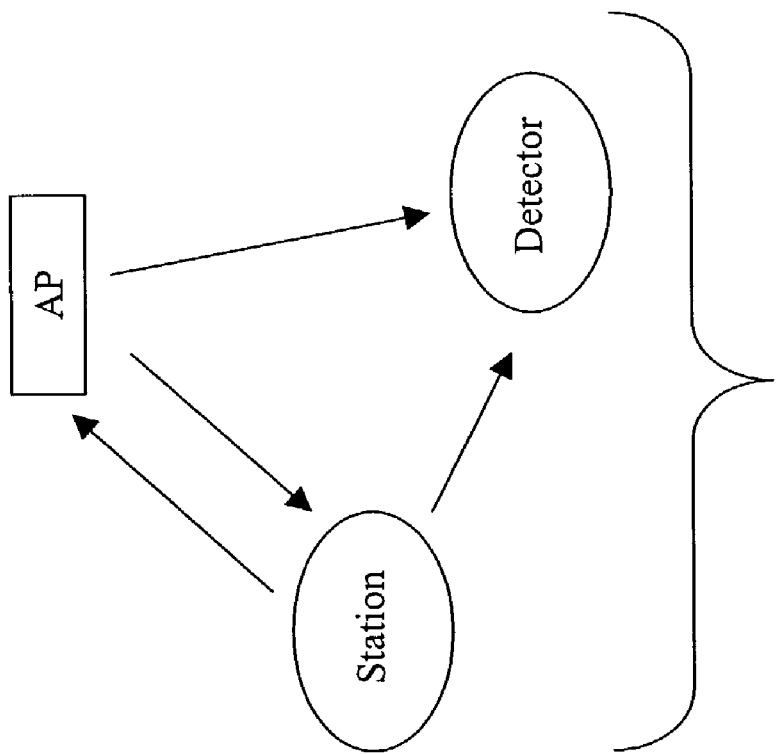
FIG. 6 shows another exemplary embodiment of an access point and a station exchanging transmissions.

For example, with reference to FIG. 6, assume that a station is having difficulty in obtaining service from an AP. Determining if the station is able to reach State 1, State 2, or State 3 can assist in trouble shooting the problem.

Thus, a detector can be located in the WLAN such that the detector can receive transmissions sent from and received by the station. Note that the detector need not necessarily be physically adjacent the station. Instead, the detector can be sufficiently near the station such that the reception range of the detector covers the station and the AP.

By examining the transmissions sent from and received by the station, the detector can determine the state of the station. More particularly, different types of transmissions can be identified as being indicative of different states. For example, in the following table are different types of transmissions and the state that they indicate:

TABLE 4

| Type of Transmission | State |
| --- | --- |
| Probe Request Transmitted by Station | 1 |
| Probe Response Transmitted by AP | 1 |
| Authentication Request Transmitted by Station | 1 |
| Authentication Response w/ Challenge Text Transmitted by AP | 1 |
| Authentication Challenge Response Transmitted by Station | 1 |
| Authentication Final Response Transmitted by AP | 1—on negative response 2—on positive response |
| Deauthentication Transmitted by AP | 1 |
| Disassociation Transmitted by AP | 1 |
| Association Request Transmitted by Station | 2 |
| Association Response Transmitted by Station | 2—on negative response 3—on positive response |
| Higher Layer Protocol Data Transmitted by Station or AP | 3 |

Thus, when a transmission sent to or from the station is received, the detector examines the transmission to determine if the transmission is one of the types of transmissions listed above. If it is, then the detector can determine the state of the station that received or sent the transmission. Note that the detector can also determine the state of the station based on the received transmissions for the station in the compiled database.

For example, if the detector receives a probe request frame sent by the station, then the detector can determine that the station is at State 1. If the detector receives a probe response frame sent by the AP to the station, then the detector can determine that the station is at State 1. If the station receives a data frame, which is a higher layer protocol data, sent by the station or received by the station, then the detector can determine that the station is at State 3.

The detector can also be configured to display the types of transmissions as a checklist. For example, the following checklist can be displayed:

TABLE 5

Beacon received by Station
Probe request sent by Station
Probe response received by Station
Auth. request sent by Station
Auth. challenge received by Station
Auth. challenge response received by Station
Auth. final response received by Station
Assoc. request sent by Station
Assoc. response received by Station
Data sent by Station
Data received by Station When one of the transmissions on the list is detected, then that type of transmission is marked. For example, if an authorization request sent by the station is received, the detector can "check off" the "Auth. request sent" line from above. In this manner, the user of the detector, such as an administrator of the WLAN or a trouble-shooter, can more easily determine the state of the station.

Additionally, as will be explained below, a station can use one or more channels. As such, a separate checklist can be provided for each of the available channels.

Figure 7:
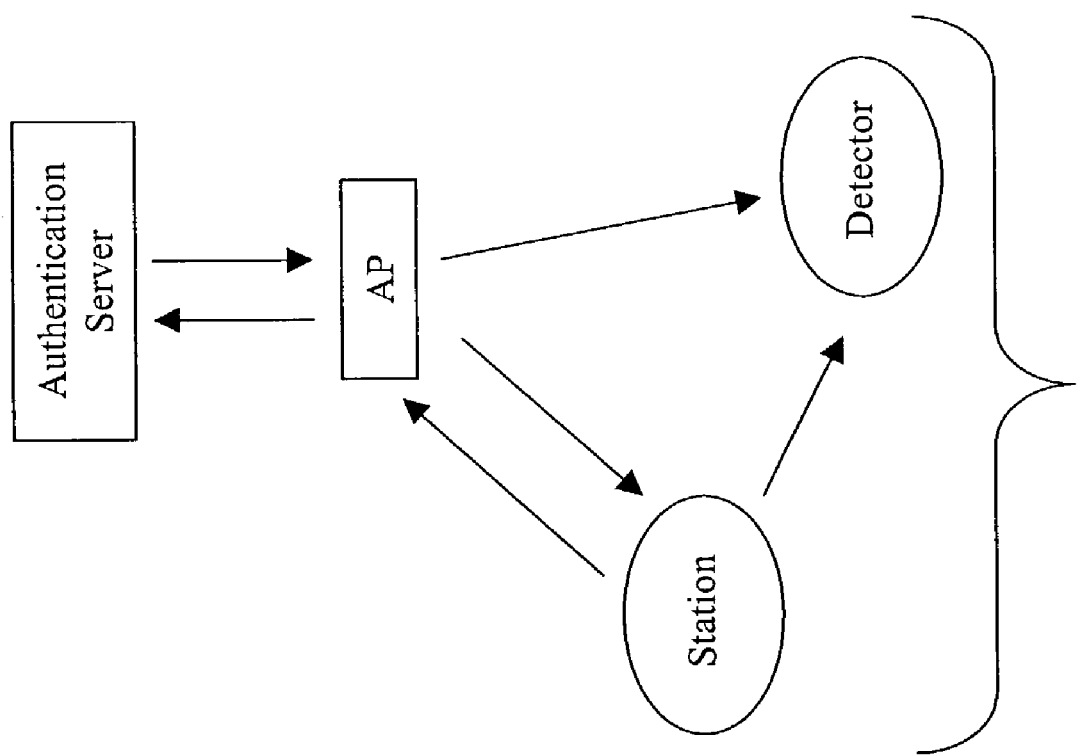
FIG. 7 shows still another exemplary embodiment of an access point and a station exchanging transmissions.

With reference to FIG. 7, as described above, before a station can receive service from an AP, the station must be authenticated. In order to increase security, an authentication protocol can be implemented in a WLAN environment, such as the extensible authentication protocol over LANs (EAPOL) protocol in accordance with the IEEE 802.1x standard.

In accordance with the current EAPOL protocol, a station wanting to be authenticated, which is referred to as a supplicant, is authenticated using an authentication server, such as a remote authentication dial in user service (RADIUS) server. As depicted in FIG. 7, the station communicates with the AP, and the AP, which is referred to as the authenticator, communicates with the authentication server to authenticate the station.

During the authentication process, the station, AP, and authentication server exchange a number of transmissions. More specifically, in one exemplary mode of operation, the AP sends an "EAP-Request/Identity" transmission to the station. The station then sends an "EAP-Response/Identity" transmission to the AP. The AP then sends the received "EAP-Response/Identity" transmission to the authentication server. In response, the authentication server sends a challenge to the AP, such as with a token password system. The AP sends the challenge to the station as a credential request. The station sends a response to the credential request to the AP. The AP sends the response to the authentication server. If the response from the station is proper, the authentication server sends an "EAP-Success" transmission to the AP, which sends the package to the station. If the response is improper, the authentication server sends an "EAP-Failure" transmission to the AP, which sends the transmission to the station. It should be recognized that the number and types of transmissions exchanged between the station, AP, and authentication server can vary depending on the implemented mode of operation.

As described above, in one exemplary embodiment, a detector can be located in the WLAN such that the detector can receive transmissions sent from and received by the station. Again, note that the detector need not necessarily be physically adjacent the station. Instead, the detector can be sufficiently near the station such that the reception range of the detector covers the station.

By examining the transmissions sent from and received by the station, the detector can determine the state of the station. More specifically, the detector can receive the transmissions exchanged between the station and the AP during the authentication process described above in accordance with the EAPOL protocol. The detector can then determine the state of the station based on the received transmissions. More particularly, because the EAPOL transactions occur in state 3 as 802.11 data, the station can be determined as being in state 3.

Additionally, the detector can also be configured to display the types of transmissions as a checklist. For example, the following checklist can be displayed:

TABLE 6

802.1X initiated sent by Station
Identity request sent by Station
Identity response received by Station
Credential request sent by Station
Credential response received by Station
802.1X authentication OK by Station
802.1X authentication failed by Station
De-authentication sent by Station
Data sent by Station
Data received by Station When one of the transmissions on the list is detected, then that type of transmission is marked. For example, if an "EAP-Request/Identity" package sent by the AP is received, the detector can "check off" the "Identity request sent" line from above. In this manner, the user of the detector, such as an administrator of the WLAN or a trouble-shooter, can more easily determine the state of the station.

Additionally, as will be explained below, a station can use one or more channels. As such, a separate checklist can be provided for each of the available channels.

To identify the transmissions sent from and received by the station, the detector obtains the MAC address of the station, which can be obtained from the source and destination address fields of the transmitted frames. The MAC address can also be obtained directly from the station. Alternatively, the MAC address of the station can be stored and retrieved from a table of MAC address assignments, which can be maintained by an administrator of the WLAN.

Additionally, if a particular AP that the station is attempting to communicate is known, the particular channel that the AP is operating on can then be monitored. If the station is attempting to communicate with multiple APs and the identity of those APs are known, then the particular channels that those APs are operating on can then be monitored.

Furthermore, the detector can scan the channels of the wireless local area network to receive transmissions sent from and received by the station with known or unknown APs. As described above, in the current implementation of the IEEE 802.11 standard, a total of 11 channels are used in the US, 13 channels are used in Europe, and 14 channels are used in Japan. For the sake of convenience, the following description will assume that the detector and the WLAN are located in the US. However, note that the detector can be configured to operate with any number of channels and in various countries.

In one configuration, the detector is configured to begin scanning by monitoring channel 1, then scan down each of the remaining 10 channels. If a station is having difficulty obtaining service, it will typically switch channels and repeat the association attempt therefore repeating the association failure scenario. A station can continuously cycle through the channels in an effort to obtain service. As such, the detector is configured to monitor a particular channel for a sufficient amount of time so that the station can complete one or more cycles. For example, the detector can be configured to monitor each channel for about 3 seconds.

If no transmissions are detected after scanning all of the channels, then the station is rebooted. As described above, a station can be configured to cycle repeatedly through the channels in an attempt to obtain service. However, a station can also be configured to only attempt one cycle and to stop after the last channel has been attempted. When the station is rebooted, it typically begins operating on channel 1. As such, by rebooting the station and monitoring on channel 1, a transmission sent to or received by the station can be detected. However, a station can take some time to reboot, typically a few seconds. As such, the detector is configured to monitor channel 1 for a longer duration than the other channels. For example, in one configuration, the detector is configured to monitor channel 1 for a period of 30 seconds.

As described above, the detector can scan the available channels in the WLAN. Alternatively, specific channels can be selected to be scanned. Although the detector scans the channels, it passively receives the transmissions, meaning that it does not broadcast signals on the WLAN. This has the advantage that additional bandwidth on the WLAN is not consumed.

The detector can be a station in the wireless local area network. Additionally, the detector can be mobile, portable, stationary, and the like. For instance, the detector can be a laptop computer, a personal digital assistant, and the like. In addition, the detector can be used by a user as a diagnostic tool, by an administrator as an administrative tool, and the like.

Based on the compiled database and/or the determined state of the station, the cause of the connectivity problem of the station can be determined. For example, the following tables lists some possible problems and a method of detecting the problem:

TABLE 7

| Problem | Detection Method |
|---|---|
| Mismatched SSID | By matching client station SSID against all SSID in the compiled database |
| Wildcard (match all) SSID | By matching client station SSID against NULL SSID. May only be a problem if there are mutiple SSIDs in the WLAN |
| Mismatched channel | By tracking traffic sent by the station in each channel, report the channel that AP of the same SSID exists but the station never transmitted any packets |

TABLE 7-continued

| Problem | Detection Method |
|---|---|
| Mismatched speed, privacy, network type, or preamble | By matching the capability attribute of the client station against ones of the AP's. If station ignores the probe request, then know that AP doesn't match stat |
| Authentication failure | By tracking authentication response packets. |
| Association failure | By tracking association response packet |
| Equipment failure | By noticing no packets transmitted at all from the station |
| AP signal to weak | By checking AP signal strength in the compiled database. The detector can be placed adjacent to the station to obtain signal strength |
| Mismatched speed | By matching station supported data rate against those of the APs |
| Mismatched WEP key | Association state reached and client station has transmitted data packets. The associated AP however sends no data packet back. |
| Higher layer protocol problem | By detecting successful data exchange between station and the AP |

Although the present invention has been described with respect to certain embodiments, examples, and applications, it will be apparent to those skilled in the art that various modifications and changes may be made without departing from the invention.

We claim:

1. A method of monitoring a wireless local area network (WLAN), the method comprising:
receiving transmissions exchanged between one or more stations and an access point (AP) in the WLAN using a detector located in the WLAN;
compiling a database including one or more individual node elements that are indexed by nodes in the WLAN, session elements, and channel elements that includes creating in the database a node element based on at least one of the received transmissions, wherein the node element in the database is identified as a node in the WLAN, wherein the node element includes a first set of statistics that tracks a number of the received transmissions that is sent into the node that is represented by the node element in the database and a second set of statistics that tracks the number of the received transmissions that is sent out of the node that is represented by the node element in the database;
analyzing the received transmissions to determine state of a station, wherein a first state of the station is associated with a first set of transmissions, and wherein determining comprises: determining if the received transmission is one of the first set of transmissions; and identifying the state of the station as being the first state when the received transmission is determined to be one of the first set of transmissions, wherein a second state of the station is associated with a second set of transmissions, and wherein determining comprises: determining if the received transmission is one of the second set of transmissions; and identifying the state of the station as being the second state when the received transmission is determined to be one of the second set of transmissions, wherein a third state of the station is associated with a third set of transmissions, and wherein determining comprises determining if the received transmission is one of the third set of transmissions; and identifying the state of the station as being the third state when the received transmission is determined to be one of the third set of transmissions, wherein the first state indicates the station has not been authenticated or associated with the access point, the second state indicates that the station has authenticated but not associated with the access point, and the third state indicates that the station has authenticated and associated with the access point; and diagnosing connectivity problems of the station using the compiled database and the determined state of the station.

2. The method of claim 1, wherein receiving comprises: obtaining a medium access control (MAC) address of the station; receiving a transmission using the detector, wherein the transmission includes a source address and a destination address; and determining if the source address or the destination address of the transmission is the MAC address of the station.

3. The method of claim 1, wherein receiving comprising: scanning a plurality of channels used in the wireless local area network using the detector; and rebooting the station if no transmissions are received during a scan of the plurality of channels.

4. The method of claim 3, wherein the station operates on a first channel after being rebooted, wherein the first channel is one of the plurality of channels used in the wireless local area network, and further comprising: scanning on the first channel using the detector for a longer period of time than other channels of the plurality of channels used in the wireless local area network.

5. The method of claim 1, wherein the node is a station or the AP, and wherein compiling further comprises creating session elements in the database based on the received transmissions, wherein a session element is associated with a session established between two nodes; and creating channel elements in the database based on the received transmissions, wherein a channel element is associated with a channel in the WLAN.

6. The method of claim 5, wherein the session element includes a first set of statistics that tracks the number of transmissions in a first direction between two nodes and a second set of statistics that tracks the number of transmissions in a second direction between two nodes; and wherein the channel element includes a set of statistics that tracks the number of transmission in the channel.

7. The method of claim 6, wherein creating the one or more individual node elements comprises: receiving a beacon frame from a node in the WLAN; determining a MAC address of the node from a source and destination field of the beacon frame; identifying the node as an AP in the database; determining if the node element exists in the database that corresponds to the node; if the node element does not exist, adding a new node element corresponding to the node in the database and updating the second set of statistics of the node element; and if the node element does exist, updating the second set of statistics of the node element.

8. The method of claim 7 further comprising: determining a channel on which the beacon frame was received; determining if a channel element exists in the data that corresponds to the channel; if the channel element does not exist, adding a new channel element corresponding to the channel in the database and updating the set of statistics of the new channel element; and if the channel element does exist, updating the set of statistics of the channel element.

9. The method of claim 6, wherein creating the one or more individual node elements comprises: receiving a probe request from a node in the WLAN;

determining a service set identification address (SSID) of the node from the received probe request; identifying the node as a station; determining if the node element exists in the database that corresponds to the node; if the node element does not exist, adding a new node element corresponding to the node in the database and updating the second set of statistics of the node element; and if the node element does exist, updating the second set of statistics of the node element.

10. The method of claim 9 further comprising: determining from the received probe request a destination node; determining a SSID of the destination node from the received probe request; identifying the destination node as an AP; determining if the node element exists in the database that corresponds to the destination node; if the node element does not exist, adding a new node element corresponding to the destination node in the database and updating the first set of statistics of the node element; and if the node element does exist, updating the first set of statistics of the node element.

11. The method of claim 6, wherein creating node elements comprises: receiving a data frame from a node in the WLAN; identifying the node from a header in the data frame; determining if the node element exists in the database that corresponds to the node; and if the node element does not exist, adding a new node element corresponding to the node in the database and updating the second set of statistics of the node element; and if the node element does exist, updating the second set of statistics of the node element.

12. The method of claim 11, wherein identifying the node comprises: if the node is indicated as a distribution system in the header, identifying the node as an AP; and if the node is not indicated as a distribution system in the header, identifying the node as a station.

13. The method of claim 11 further comprising: determining from the received data frame a destination node; identifying the destination node from the header; determining if the node element exists in the database that corresponds to the destination node; if the node element does not exist, adding a new node element corresponding to the destination node in the database and updating the first set of statistics of the node element; and if the node element does exist, updating the first set of statistics of the node element.

14. The method of claim 13, wherein identifying the destination node comprises: if the destination node is indicated as a distribution system in the header, identifying the destination node as an AP; and if the destination node is not indicated as a distribution system in the header, identifying the destination node as a station.

15. The method of claim 13, wherein creating session elements comprises: identifying a session between the node and the destination node; determining if a session element exists in the database that corresponds to the identified session; if the session element does not exist, adding a new session element corresponding to the identified session in the database and updating the first/second set of statistics of the new session element; and if the session element does exist, updating the first/second set of statistics of the session element.

16. The method of claim 1, wherein transmissions are received and the database is compiled during a period of time.

17. The method of claim 1, wherein analyzing comprises: examining a received transmission; and determining an indicative state of the station associated with the received transmission.

18. The method of claim 1, wherein the transmissions exchanged between the station and the access point comply with an extensible authentication protocol over local area networks (EAPOL) protocol.

19. The method of claim 1, wherein analyzing comprises: displaying a list of transmissions on the detector, wherein the list includes different types of transmissions potentially exchanged between the station and the access point; and when a received message corresponds to one of the types of transmissions in the list of transmissions, indicating on the list of transmissions that the type of transmission corresponding to the received message was received.

20. The method of claim 19, wherein the types of transmissions include transmissions exchanged between the station and the access point during an authentication process in accordance with an extensible authentication protocol over local area networks (EAPOL) protocol.

21. A method of monitoring a wireless local area network (WLAN), the method comprising:
receiving transmissions exchanged between one or more stations and an access point (AP) in the WLAN using a detector located in the WLAN;
compiling a database based on the received transmissions that includes creating a node element in the database based on at least one of the received transmissions, wherein the node element in the database is identified as a node in the WLAN, wherein the node element includes first data identifying the node in the WLAN, second data associated with the received transmissions that are sent into the node that is represented by the node element in the database and third data associated with the received transmissions that are sent out of the node that is represented by the node element in the database;
analyzing the received transmissions to determine state of a station, wherein a first state of the station is associated with a first set of transmissions, and wherein determining comprises: determining if the received transmission is one of the first set of transmissions; and identifying the state of the station as being the first state when the received transmission is determined to be one of the first set of transmissions, wherein a second state of the station is associated with a second set of transmissions, and wherein determining comprises: determining if the received transmission is one of the second set of transmissions; and identifying the state of the station as being the second state when the received transmission is determined to be one of the second set of transmissions, wherein a third state of the station is associated with a third set of transmissions, and wherein determining comprises determining if the received transmission is one of the third set of transmissions; and identifying the state of the station as being the third state when the received transmission is determined to be one of the third set of transmissions, wherein the first state indicates the station has not been authenticated or associated with the access point, the second state indicates that the station has authenticated but not associated with the access point, and the third state indicates that the station has authenticated and associated with the access point; and
diagnosing connectivity problems of the station using the compiled database and the determined state of the station, wherein the diagnosing comprises detecting a mismatched SSID problem by matching a client station SSID against SSIDs in the compiled database; detecting a wildcard SSID problem by matching a client station SSID against NULL SSID; detecting a mismatched channel problem by tracking traffic sent by a station in each channel; detecting a mismatched speed, privacy, network type, or preamble problem by matching a capability attribute of a station against that of the AP; detecting an authentication failure problem by tracking authentication response packets; detecting an association failure problem by tracking association response packets; detecting an equipment failure problem when no packets are transmitted from a station; detecting a weak AP signal problem by checking AP signal strength in the compiled database; detecting a mismatched wired equivalent privacy (WEP) key problem when a station reaches an association state and has transmitted data packets but an associated AP does not send packets back to the station; or a higher layer protocol problem by detecting successful data exchanges between a station and an AP.

22. A system to monitor a wireless local area network (WLAN), the system comprising:
one or more stations;
an access point (AP) that communicates with the one or more stations in the WLAN;
a detector that receives transmissions exchanged between the one or more stations and the AP in the WLAN; and
a database that includes one or more individual node elements that are indexed by nodes in the WLAN, session elements, and channel elements, wherein the database is compiled by creating a node element in the database based on at least one of the received transmissions, wherein the node element is identified as a node in the WLAN, wherein the node element includes a first set of statistics that tracks a number of the received transmissions that is sent into the node represented by the node element in the database and a second set of statistics that tracks the number of the received transmissions that is sent out of the node represented by the node element in the database; wherein connectivity problems of a station in the WLAN is diagnosed using the compiled database and a determined state of the station, by analyzing the received transmissions to determine state of a station wherein the state of the station is determined by examining a received transmission; and determining an indicative state of the station associated with the received transmission; wherein a first state of the station is associated with a first set of transmissions a second state of the station is associated with a second set of transmissions and a third state of the station is associated with a third set of transmissions, and wherein determining comprises determining if the received transmission is one of the first set of transmissions;
identifying the state of the station as being the first state when the received transmission is determined to be one of the first set of transmissions; determining if the received transmission is one of the second set of transmissions; identifying the state of the station as being the second state when the received transmission is determined to be one of the second set of transmissions determining if the received transmission is one of the third set of transmissions; and identifying the state of the station as being the third state when the received transmission is determined to be one of the third set of transmissions, wherein the first state indicates the station has not been authenticated or associated with the access point, the second state indicates that the station has authenticated but not associated with the access point, and the third state indicates that the station has authenticated and associated with the access point.

23. The system of claim 22, wherein the node element is associated with a station or an AP in the WLAN; session elements, wherein a session element is associated with a session established between two nodes; and channel elements, wherein a channel element is associated with a channel in the WLAN.

24. The system of claim 23, wherein node elements are created by: receiving a beacon frame from a node in the WLAN; determining a MAC address of the node from a source and destination field of the beacon frame; identifying the node as an AP in the database; determining if the node element exists in the database that corresponds to the node; and if the node element does not exist, adding a new node element corresponding to the node in the database.

25. The system of claim 23, wherein node elements are created by: receiving a probe request from a node in the WLAN; determining a service set identification address (SSID) of the node from the received probe request; identifying the node as a station; determining if the node element exists in the database that corresponds to the node; if the node element does not exist, adding a new node element corresponding to the node in the database; determining from the received probe request a destination node; determining a SSID of the destination node from the received probe request; identifying the destination node as an AP; determining if the node element exists in the database that corresponds to the destination node; and if the node element does not exist, adding a new node element corresponding to the destination node in the database.

26. The system of claim 23, wherein node elements are created by: receiving a data frame from a node in the WLAN; identifying the node from a header in the data frame; determining if the node element exists in the database that corresponds to the node; if the node element does not exist, adding a new node element corresponding to the node in the database; determining from the received data frame a destination node; identifying the destination node from the header; determining if the node element exists in the database that corresponds to the destination node; and if the node element does not exist, adding a new node element corresponding to the destination node in the database.

27. The system of claim 26, wherein session elements are created by: identifying a session between the node and the destination node; determining if a session element exists in the database that corresponds to the identified session; if the session element does not exist, adding a new session element corresponding to the identified session in the database.

28. A system to monitor a wireless local area network (WLAN), the system comprising:
one or more stations;
an access point (AP) that communicates with the one or more stations in the WLAN;
a detector that receives transmissions exchanged between the one or more stations and the AP in the WLAN;
analyzing the received transmissions to determine state of a station wherein the state of the station is determined by examining a received transmission; and determining an indicative state of the station associated with the received transmission; wherein a first state of the station is associated with a first set of transmissions a second state of the station is associated with a second set of transmissions and a third state of the station is associated with a third set of transmissions, and wherein determining comprises determining if the received transmission is one of the first set of transmissions; identifying the state of the station as being the first state when the received transmission is determined to be one of the first set of transmissions; determining if the received transmission is one of the second set of transmissions; identifying the state of the station as being the second state when the received transmission is determined to be one of the second set of transmissions determining if the received transmission is one of the third set of transmissions; and identifying the state of the station as being the third state when the received transmission is determined to be one of the third set of transmissions, wherein the first state indicates the station has not been authenticated or associated with the access point, the second state indicates that the station has authenticated but not associated with the access point, and the third state indicates that the station has authenticated and associated with the access point; and a database compiled based on the received transmissions by creating a node element in the database based on at least one of the received transmissions, wherein the node element in the database is identified as a node in the WLAN, wherein the node element includes first data identifying the node in the WLAN, second data associated with the received transmissions that are sent into the node represented by the node element in the database and third data associated with the received transmissions that are sent out of the node represented by the node element in the database; wherein connectivity problems of a station in the WLAN is diagnosed using the compiled database and a determined state of the station, wherein the connectivity problems of a station in the WLAN is diagnosed using the compiled database and a determined state of the station by: detecting a mismatched SSID problem by matching a client station SSID against SSIDs in the compiled database; detecting a wildcard SSID problem by matching a client station SSID against NULL SSID; detecting a mismatched channel problem by tracking traffic sent by a station in each channel; detecting a mismatched speed, privacy, network type, or preamble problem by matching a capability attribute of a station against that of the AP; detecting an authentication failure problem by tracking authentication response packets; detecting an association failure problem by tracking association response packets; detecting an equipment failure problem when no packets are transmitted from a station; detecting a weak AP signal problem by checking AP signal strength in the compiled database; detecting a mismatched wired equivalent privacy (WEP) key problem when a station reaches an association state and has transmitted data packets but an associated AP does not send packets back to the station; or a higher layer protocol problem by detecting successful data exchanges between a station and an AP.

29. A computer-readable storage medium containing computer executable code to monitor a wireless local area network (WLAN) by instructing a computer to operate as follows:
receiving transmissions exchanged between one or more stations and an access point (AP) in the WLAN using a detector located in the WLAN;
compiling a database including one or more of individual node elements that are indexed by nodes in the WLAN, session elements, and channel elements that includes creating a node element in the database based on at least one of the received transmissions, wherein the node element in the database is identified as a node in the WLAN, wherein the node element includes a first set of statistics that tracks a number of the received transmissions that is sent into the node represented by the node element in the database and a second set of statistics that tracks the number of the received transmissions that is sent out of the node represented by the node element in the database;

analyzing the received transmissions to determine the state of a station, wherein analyzing comprises examining a received transmission; and determining an indicative state of the station associated with the received transmission, wherein a first state of the station is associated with a first set of transmissions, a second state of the station is associated with a second set of transmissions and a third state of the station is associated with a third set of transmissions, and wherein determining comprises determining if the received transmission is one of the first set of transmissions; identifying the state of the station as being the first state when the received transmission is determined to be one of the first set of transmissions; determining if the received transmission is one of the second set of transmissions; identifying the state of the station as being the second state when the received transmission is determined to be one of the second set of transmissions determining if the received transmission is one of the third set of transmissions; and identifying the state of the station as being the third state when the received transmission is determined to be one of the third set of transmissions, wherein the first state indicates the station has not been authenticated or associated with the access point, the second state indicates that the station has authenticated but not associated with the access point, and the third state indicates that the station has authenticated and associated with the access point; and diagnosing connectivity problems of the station using the compiled database and the determined state of the station.

30. The computer-readable storage medium of claim 29, wherein compiling comprises: creating node elements in the database based on the received transmissions, wherein the node element is associate with a station or an AP in the WLAN; creating session elements in the database based on the received transmissions, wherein a session element is associated with a session established between two nodes; and creating channel elements in the database based on the received transmissions, wherein a channel element is associated with a channel in the WLAN.

31. The computer-readable storage medium of claim 30, wherein creating node elements comprises: receiving a beacon frame from a node in the WLAN; determining a MAC address of the node from a source and destination field of the beacon frame; identifying the node as an AP in the database; determining if the node element exists in the database that corresponds to the node; and if the node element does not exist, adding a new node element corresponding to the node in the database.

32. The computer-readable storage medium of claim 30, wherein creating node elements comprises: receiving a probe request from a node in the WLAN; determining a service set identification address (SSID) of the node from the received probe request; identifying the node as a station; determining if the node element exists in the database that corresponds to the node; if the node element does not exist, adding a new node element corresponding to the node in the database; determining from the received probe request a destination node; determining a SSID of the destination node from the received probe request; identifying the destination node as an AP; determining if the node element exists in the database that corresponds to the destination node; and if the node element does not exist, adding a new node element corresponding to the destination node in the database.

33. The computer-readable storage medium of claim 30, wherein creating node elements comprises: receiving a data frame from a node in the WLAN; identifying the node from a header in the data frame; determining if the node element exists in the database that corresponds to the node; if the node element does not exist, adding a new node element corresponding to the node in the database; determining from the received data frame a destination node; identifying the destination node from the header; determining if the node element exists in the database that corresponds to the destination node; and if the node element does not exist, adding a new node element corresponding to the destination node in the database.

34. The computer-readable storage medium of claim 33, wherein creating session elements comprises: identifying a session between the node and the destination node; determining if a session element exists in the database that corresponds to the identified session; if the session element does not exist, adding a new session element corresponding to the identified session in the database.

35. A computer-readable storage medium containing computer executable code to monitor a wireless local area network (WLAN) by instructing a computer to operate as follows:

receiving transmissions exchanged between one or more stations and an access point (AP) in the WLAN using a detector located in the WLAN;

compiling a database based on the received transmissions that includes creating a node element in the database based on at least one of the received transmissions, wherein the node element in the database is identified as a node in the WLAN, wherein the node element includes first data identifying the node in the WLAN, second data associated with the received transmissions that are sent into the node represented by the node element in the database and third data associated with the received transmissions that are sent out of the node represented by the node element in the database, wherein the database includes node elements, session elements, and channel elements;

analyzing the received transmissions to determine state of a station, wherein the state of the station is determined by examining a received transmission; and determining an indicative state of the station associated with the received transmission; wherein a first state of the station is associated with a first set of transmissions a second state of the station is associated with a second set of transmissions and a third state of the station is associated with a third set of transmissions, and wherein determining comprises determining if the received transmission is one of the first set of transmissions; identifying the state of the station as being the first state when the received transmission is determined to be one of the first set of transmissions; determining if the received transmission is one of the second set of transmissions; identifying the state of the station as being the second state when the received transmission is determined to be one of the second set of transmissions determining if the received transmission is one of the third set of transmissions; and identifying the state of the station as being the third state when the received transmission is determined to be one of the third set of transmissions, wherein the first state indicates the station has not been authenticated or associated with the access point, the second state indicates that the station has authenticated but not associated with the access point, and the third state indicates that the station has authenticated and associated with the access point; and diagnosing connectivity problems of the station using the compiled database and the determined state of the station, wherein diagnosing comprises: detecting a mismatched SSID problem by matching a client station SSID against SSIDs in the compiled database; detecting a wildcard SSID problem by matching a client station SSID against NULL SSID; detecting a mismatched channel problem by tracking traffic sent by a station in each channel; detecting a mismatched speed, privacy, network type, or preamble problem by matching a capability attribute of a station against that of the AP; detecting an authentication failure problem by tracking authentication response packets; detecting an association failure problem by tracking association response packets; detecting an equipment failure problem when no packets are transmitted from a station; detecting a weak AP signal problem by checking AP signal strength in the compiled database; detecting a mismatched wired equivalent privacy (WEP) key problem when a station reaches an association state and has transmitted data packets but an associated AP does not send packets back to the station; or a higher layer protocol problem by detecting successful data exchanges between a station and an AP.

* * * * *